United States Patent
Goss et al.

(10) Patent No.: US 8,590,429 B2
(45) Date of Patent: Nov. 26, 2013

(54) TORQUE LIMITING SOCKET AND METHOD OF USING SAME

(71) Applicant: Acument Intellectual Properties, LLC, Sterling Heights, MI (US)

(72) Inventors: David Goss, Rockford, IL (US); Richard Seidl, Rockford, IL (US)

(73) Assignee: Acument Intellectual Properties, LLC, Sterling Heights, MI (US)

( * ) Notice: Subject to any disclaimer, the term of this patent is extended or adjusted under 35 U.S.C. 154(b) by 0 days.

(21) Appl. No.: 13/735,403

(22) Filed: Jan. 7, 2013

(65) Prior Publication Data

US 2013/0129441 A1    May 23, 2013

Related U.S. Application Data

(62) Division of application No. 12/871,482, filed on Aug. 30, 2010, now abandoned.

(60) Provisional application No. 61/239,149, filed on Sep. 2, 2009.

(51) Int. Cl.
  *B25B 13/48*    (2006.01)

(52) U.S. Cl.
  USPC ................................................................. 81/55

(58) Field of Classification Search
  USPC ......... 73/862.22, 862.23, 862.26; 81/55, 467, 81/473, 479, 481
  See application file for complete search history.

(56) References Cited

U.S. PATENT DOCUMENTS

| | | | |
|---|---|---|---|
| 4,084,513 A | 4/1978 | Bullock | |
| 4,316,417 A | 2/1982 | Martin | |
| 4,649,727 A | 3/1987 | Gray | |
| 4,784,549 A | 11/1988 | Wing | |
| 5,520,075 A | 5/1996 | Barmore | |
| 5,950,508 A * | 9/1999 | Rossi | 81/451 |
| 6,868,759 B2 | 3/2005 | Tuan-Mu | |
| 7,631,583 B2 * | 12/2009 | Hsieh | 81/467 |
| 8,371,194 B2 * | 2/2013 | Wu et al. | 81/478 |
| 2007/0119267 A1 * | 5/2007 | Anjanappa et al. | 73/862.21 |

FOREIGN PATENT DOCUMENTS

JP      06-80565      11/1994

* cited by examiner

*Primary Examiner* — Robert Pezzuto
(74) *Attorney, Agent, or Firm* — Clark Hill PLC

(57) ABSTRACT

In a preferred embodiment, a driver socket is configured to provide a visual indicator on a portion of a locknut upon application of a predetermined torque to the driver socket relative to the locknut. The driver socket has a member which is positioned proximate to the first end, with a portion thereof protruding into an aperture of the driver socket. The member is configured to engage a drive configuration of a locknut in order to apply nut torque to the locknut upon rotation of the drive socket and to form a mark on the drive configuration of the locknut in order to provide a visual indicator on the locknut that the locknut has been subjected to the desired torque during initial assembly. The driver socket is preferably attached to a ratchet arm of a fastening tool which provides a mechanical advantage in applying the desired torque.

5 Claims, 15 Drawing Sheets

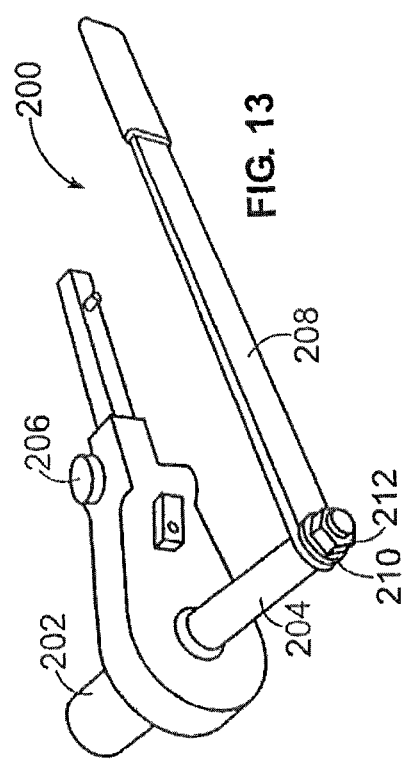
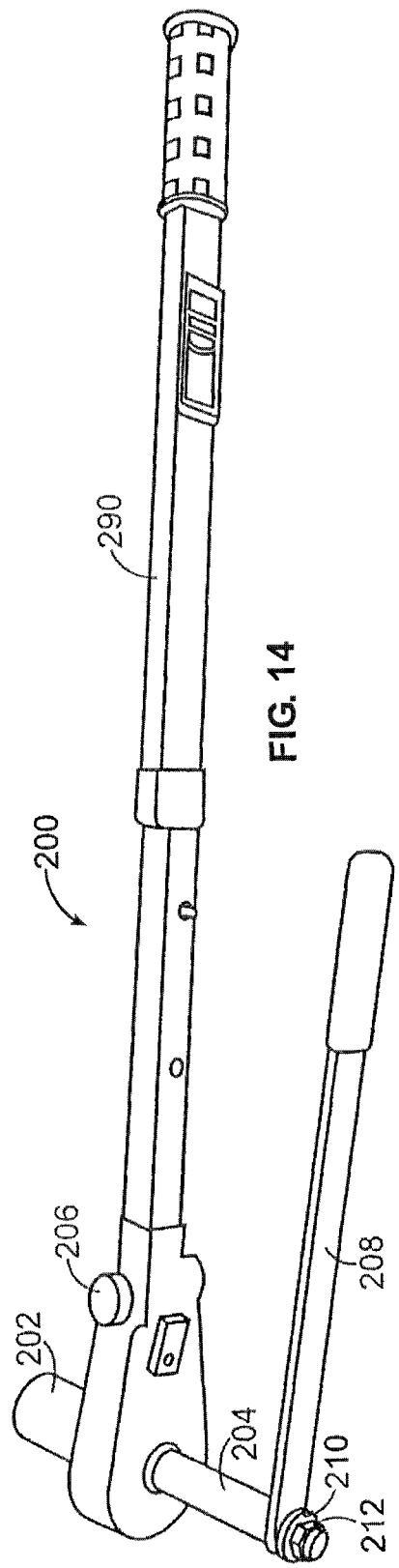

TORQUE LIMITING SOCKET AND METHOD OF USING SAME

CROSS-REFERENCE AND INCORPORATION BY REFERENCE

This patent application is a Divisional of U.S. patent application Ser. No. 12/871,482, filed Aug. 30, 2010, and entitled "Torque Limiting Socket and Method of Using Same" which, in turn, claims the benefit of domestic priority of U.S. Provisional Application Ser. No. 61/239,149, filed Sep. 2, 2009, and entitled "Torque Limiting Socket and Method of Using Same", U.S. patent application Ser. No. 12/871,482 and U.S. Provisional Patent Application Ser. No. 61/239,149 are hereby incorporated by reference in their entireties.

BACKGROUND OF THE INVENTION

As generally discussed in U.S. Pat. No. 4,316,417 to Martin, railway car tracks generally include two windowed side frames and a truck bolster having ends disposed in the windows for permissible vertical and horizontal movement therein. The bolster extends across the truck and is supported by load carrying springs between the side frames and the bolster ends. Pockets are usually provided in the side frames or the bolsters to receive wedge or friction shoes. Each shoe has a vertical friction surface which engages a friction surface on the vertical column of the side frame and an inclined wedging friction surface engaging an inclined friction surface on the bolster. There may be one or two such wedge and pocket assemblies at each end of the bolster. Wear resistant wear plates are provided on the vertical columns of the side frame coming into engagement with the friction wedge. Many known techniques have been utilized to secure the wear plate to the column.

One such technique was to use a body side bearing bolt and a flange locknut sold under the trademark CAMRAIL® and which are manufactured and sold by licensees and/or related companies of the assignee of the present application, namely Acument Intellectual Properties, LLC. The description of the structure of the CAMRAIL® bolts and locknuts, as well as their installations, are illustrated in FIGS. 3 and 4.

The CAMRAIL® bolt 20 is best illustrated in FIG. 1. The bolt 20 has an enlarged head 22 defining top and bottom surfaces 24, 26 thereof. The top surface 24 is flat and the bottom surface 26 tapers from the top surface 24 to a stem 28 of the bolt 20, which extends outwardly to an end 30 of the bolt 20. The stem 28 is threaded from the end 30 to a position proximate to the tapered bottom surface 26 of the enlarged head 22, but not all the way to the tapered bottom surface 26. If desired, in other versions of the CAMRAIL® bolt (depending on the application to be used and the configuration of the side frames and wear plates), the bottom surface 26 may also be flat and separated from the top surface 24 such that the bottom surface 26 acts as a shoulder between the stem 28 and the enlarged head 22.

An extension member 32 extends outwardly from the top surface 24 of the enlarged head 22 of the bolt 20 to an opposite end 34 of the bolt 20. The extension member 32 has first and second portions 36, 38. The first portion 36 extends outwardly from the top surface 24 to the second portion 38. The second portion 38 extends outwardly from the first portion 36 to the end 34. The second portion 38 has an external TORX® drive configuration formed therein/thereon in order to allow the bolt 20 to be engaged at the second portion 38 of the extension member 32 in order to impart a driving or releasing torque to the bolt 20. Other versions of the CAMRAIL® bolt may have alternative drive configurations formed in/on the second portion 38 of the extension member, such as, for example, an external TORX PLUS® drive configuration. The second portion 38 has a larger outer diameter than the first portion 36 such that a groove 40 is formed between the second portion 38 of the extension member 32 and the top surface 24 of the enlarged head 22.

The locknut 42 is best illustrated in FIG. 2. The locknut 42 has an aperture 44 provided therethrough defining an aperture wall 46 which is threaded. An outer surface 48 of the locknut 42 has a plurality of flat surfaces, such as in a hex configuration, in order to allow for a tool, such as a wrench to engage the locknut 42 in order to tighten or loosen the locknut 42.

In application, as illustrated in FIGS. 3 and 4, the bolt 20 is inserted through a hole in the wear plate 70 and then through a hole in the side frame 80 until the enlarged head 22 of the bolt 20 is prevented from moving further through the holes. The hole in the wear plate 70 has a countersink in order to accommodate the tapered enlarged head 22 of the bolt 20. The non threaded portion of the stem 28 is positioned within the hole of the side frame 80. The locknut 42 is then secured to the stem 28 of the bolt 20 by threading the aperture wail 46 of the locknut 42 onto the threaded stem 28 until the locknut 42 bottoms out against the side frame 80. The locknut 42 is then engaged by a wrench on its outer surface 48 in order to hold the locknut 42 in place, i.e., to prevent further rotation of the locknut 42.

Thereafter, a torque applying tool is engaged with the external TORX® drive configuration on/in the second portion 38 of the extension member 32 of the bolt 20 in order to further tighten and secure the assembly of the bolt 20, locknut 42, wear plate 70 and side frame 80 together. In order to ensure that the assembly is not tightened too much, the extension member 32 is configured to break in the first portion 36 thereof when a predetermined torque is reached, as illustrated in FIG. 4.

Thereafter, it is necessary to ensure that the assembly is properly secured together, which is done by applying a predetermined amount of torque to the locknut 42, typically by a torque wrench. If the locknut 42 rotates in response to the application of this predetermined amount of torque applied by the torque wrench, the securement of the assembly is deemed to have failed, even if the bolt 20 had, in fact, had the proper clamp load applied to it. In this event, as the external TORX® drive configuration on/in the second portion 38 of the extension member 32 has already been broken off of the bolt 20, there is no way to reuse this bolt 20 in order to have it properly secure the assembly together. As such, the bolt 20 must be removed, typically by cutting or drilling, and a new bolt 20 must be used to secure the assembly together. Obviously, the failure of the bolt 20 causes increased time and expense as it requires the bolt 20 to be removed and the installation of a new bolt 20, which may or may not fail, such that if there is a failure, the process must again be repeated.

Thus, there is a need to have the ability to ensure that the bolt has the proper clamp load in order to properly secures the assembly together. It is also desirable to have a visual indicator that the nut has been subjected to the desired torque during initial assembly and application of nut torque. Furthermore, it is also desirable to be able to visually determine that the nut has been subjected to the desired torque during routine maintenance service that takes places at some point in time after the initial assembly. It would also be desirable to eliminate the initial cost, maintenance and calibration of a torque wrench.

SUMMARY OF THE INVENTION

Briefly, and in accordance with the foregoing, the invention provides a driver socket which is configured to provide a visual indicator on a portion of a locknut upon application of a predetermined torque to the driver socket relative to the locknut. The driver socket has first and second ends, an outer surface extending from the first end to the second end, and an aperture which extends from the first end to the second end. The driver socket also has a member which is positioned therein proximate to the first end, with a portion of the member protruding into the aperture. In a preferred embodiment, two members are provided which are positioned opposite one another, about 180 degrees apart from one another, although more or less members may be provided as desired. In a first preferred embodiment, the member is a ball bearing and in a second preferred embodiment, the member is a cylindrical rod. The outer surface of the driver socket has a drive portion, preferably hexagonal, proximate to the second end thereof.

The locknut has an external drive configuration to which the member can engage. In a preferred embodiment, the external drive configuration is a TORX® or TORX PLUS® drive configuration such that the member can engage the drive configuration by fitting between the outwardly extending lobes formed on the outer surface of the locknut. The members can thus be used to apply the nut torque to the locknut, but also have the added benefit of being able to leave a visual indicator on the locknut when the desired torque value is achieved. The visual indicator on the locknut is preferably a marking, such as, for example, a groove or notch, as would be provided on an external lobe of a locknut having a TORX® or TORX PLUS® drive configuration. The marking could be formed by, for example, shearing or deforming the external lobe. The marking of the locknut provides a number of benefits.

The driver socket can be attached to a ratchet arm of a fastening tool which provides a mechanical advantage in applying the desired torque. The fastening tool also has a handle connected to a second driver socket which is configured to engage with a drive configuration on a bolt, to which the locknut is secured, in order to assist in the application of the nut torque.

BRIEF DESCRIPTION OF THE DRAWINGS

For a more complete understanding of the disclosure, reference may be made to the following detailed description and accompanying drawings wherein like reference numerals identify like elements in which:

FIG. 13 is a perspective view of a dual socket ratchet assembly;
FIG. 14 is an alternative view of a dual socket ratchet assembly having a torque wrench attached thereto.

DETAILED DESCRIPTION OF THE ILLUSTRATED EMBODIMENTS

Figure 1:
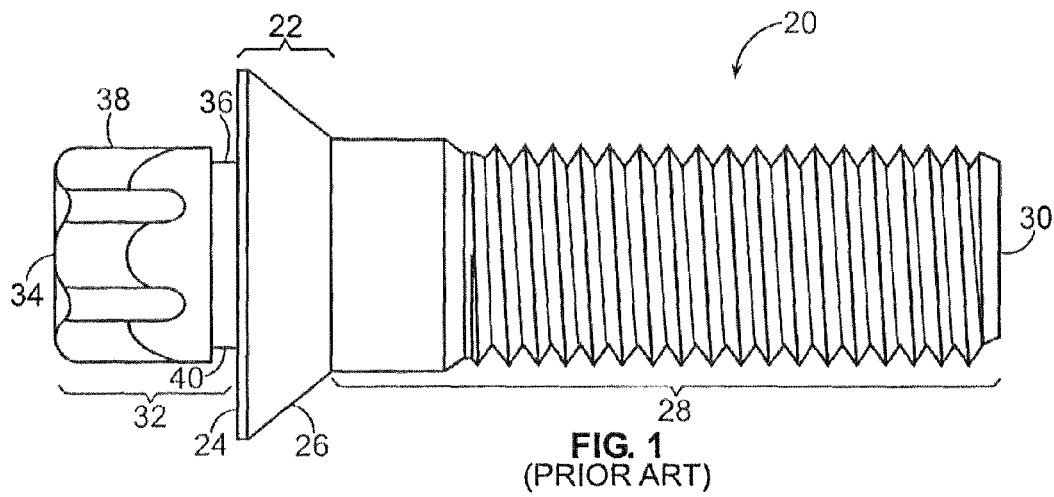
FIG. 1 is a side view of a prior art CAMRAIL® bolt.
Figure 2:
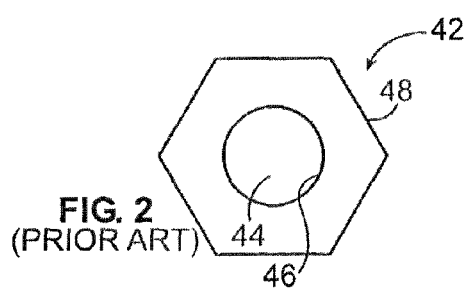
FIG. 2 is a front view of a prior art locknut.
Figure 3:
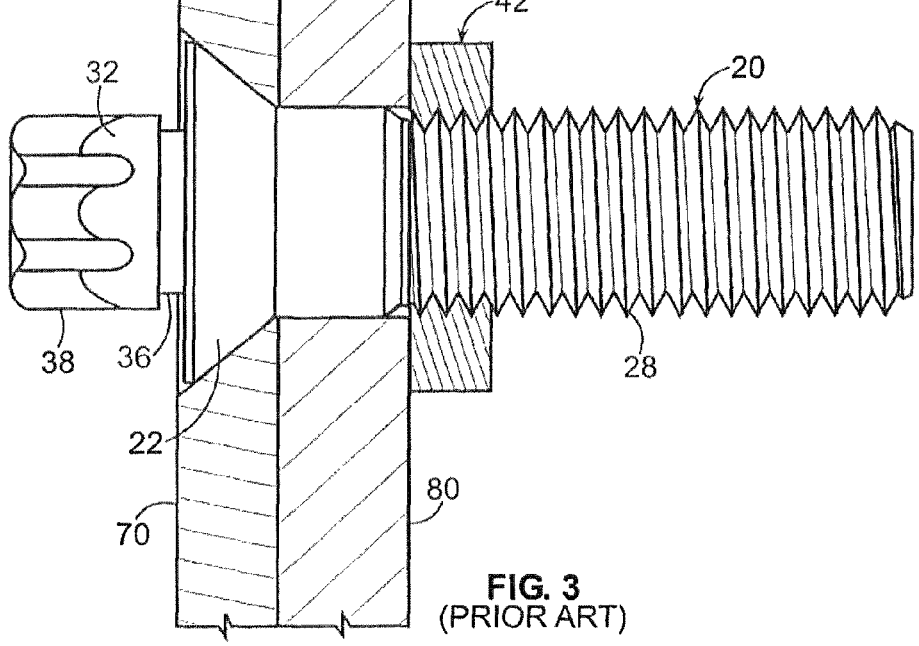
FIGS. 3 and 4 are partial cross-sectional views illustrating a prior art method of securing the bolt of FIG. 1 and the locknut of FIG. 2 together and to a wear plate and a side frame.
Figure 4:
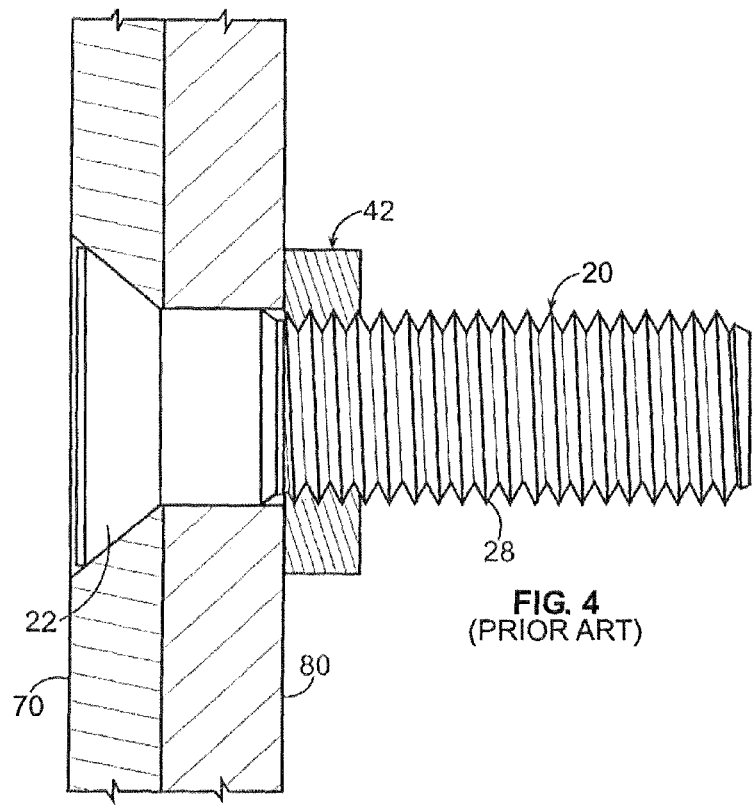

While the present disclosure is susceptible to various modifications and alternative forms, certain embodiments are shown by way of example in the drawings and these embodiments will be described in detail herein. It will be understood, however, that this disclosure is not intended to limit the invention to the particular form described, but to the contrary, the invention is intended to cover all modifications, alternatives, and equivalents falling within the spirit and scope of the invention defined by the appended claims.

Figure 5:
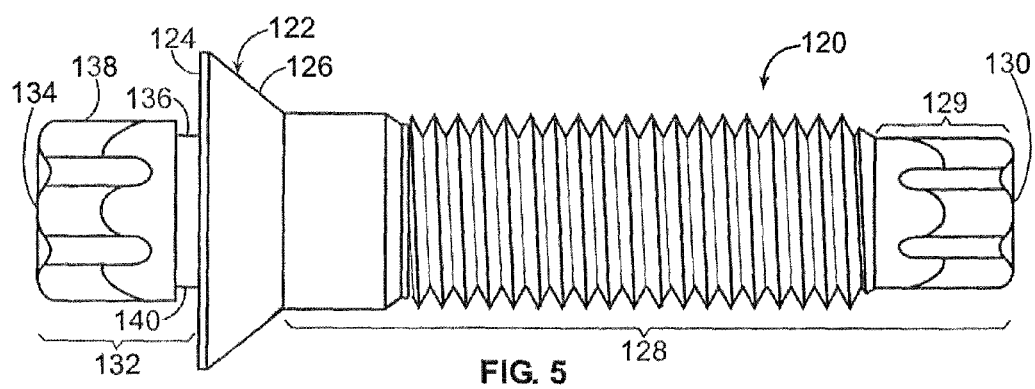
FIG. 5 is a side view of an embodiment of a bolt.

A bolt 120 is illustrated in FIG. 5. The bolt 120 has an enlarged head 122 defining top and bottom surfaces 124, 126 thereof. The top surface 124 is flat and the bottom surface 126 tapers from the top surface 124 to a stem 128 of the bolt 120, which extends outwardly to an end 130 of the bolt 120. The stem 128 is threaded from an end portion 129 of the stem 128 to a position proximate to the proximate to the tapered bottom surface 126 of the enlarged head 122, but not all the way to the tapered bottom surface 126, if desired, in other versions of the bolt 120 (depending on the application to be used and the configuration of the side frames 80 and wear plates 70), the bottom surface 126 may also be flat and separated from the top surface 124 such that the bottom surface 126 acts as a shoulder between the stem 1.28 and the enlarged head 122.

The end portion 129 of the stein 128 extends from the threading on the stem 128 to the end 130 of the bolt 120. The end portion 129 has an external drive configuration formed therein/thereon in order to allow the bolt 120 to be engaged at the end portion 129. The external drive configuration formed in/on the end portion 129 is preferably an external TORX® or TORX PLUS® drive configuration, but it is to be understood that alternative drive configurations could be formed in/on the end portion 129 as desired.

An extension member 132 extends outwardly from the top surface 124 of the enlarged head 122 of the bolt 120 to an opposite end 134 of the bolt 120. The extension member 132 has first and second portions 136, 138. The first portion 136 extends outwardly from the top surface 124 to the second portion 138. The second portion 138 extends outwardly from the first portion 136 to the end 134. The second portion 138 has an external drive configuration formed therein/thereon in order to allow the bolt 120 to be engaged at the second portion 138 of the extension member 132 in order to impart a driving or releasing torque to the bolt 120. The external drive configuration formed in/on the second portion 138 is preferably an external TORX® or TORX PLUS® drive configuration, but it is to be understood that alternative drive configurations could be formed in/on the second portion 138 as desired. The second portion 138 has a larger outer diameter than the first portion 136 such that a groove 140 is formed between the second portion 138 of the extension member 132 and the top surface 124 of the enlarge head 122.

Thus, the bolt 120 is generally identical to the CAM-RAIL® bolt 20 illustrated in FIG. 1, except that the bolt 120 includes the end portion 129 having the external drive configuration formed therein/thereon.

Figure 5A:
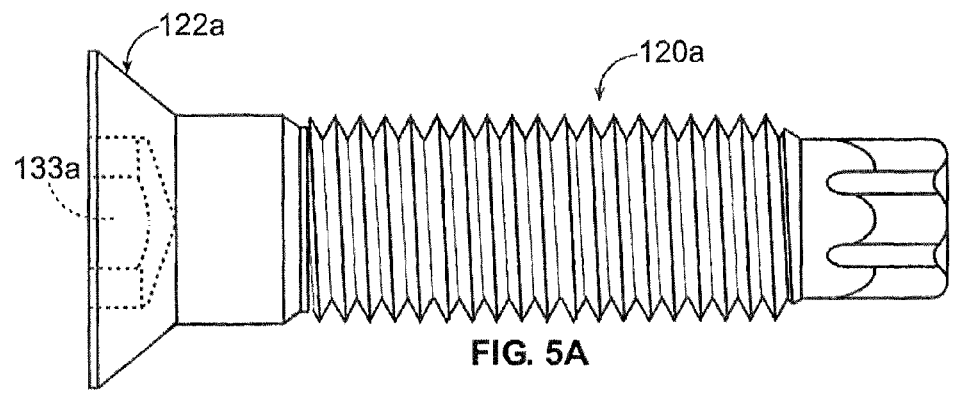
FIG. 5A is a side view of an alternative embodiment of a bolt.

An alternative embodiment of the bolt 120a is illustrated in FIG. 5A. The bolt 120a is identical to the bolt 120 except that the extension member 132 is not provided, but rather a recess 133a is provided in the enlarged head 122a. The recess 13a defines an internal drive configuration formed in the enlarged head 122a which is preferably an internal TORX® err TORR PLUS® drive configuration, but it is to be understood that alternative drive configurations could be formed in the enlarged head 122a as desired.

Figures 6, 7:
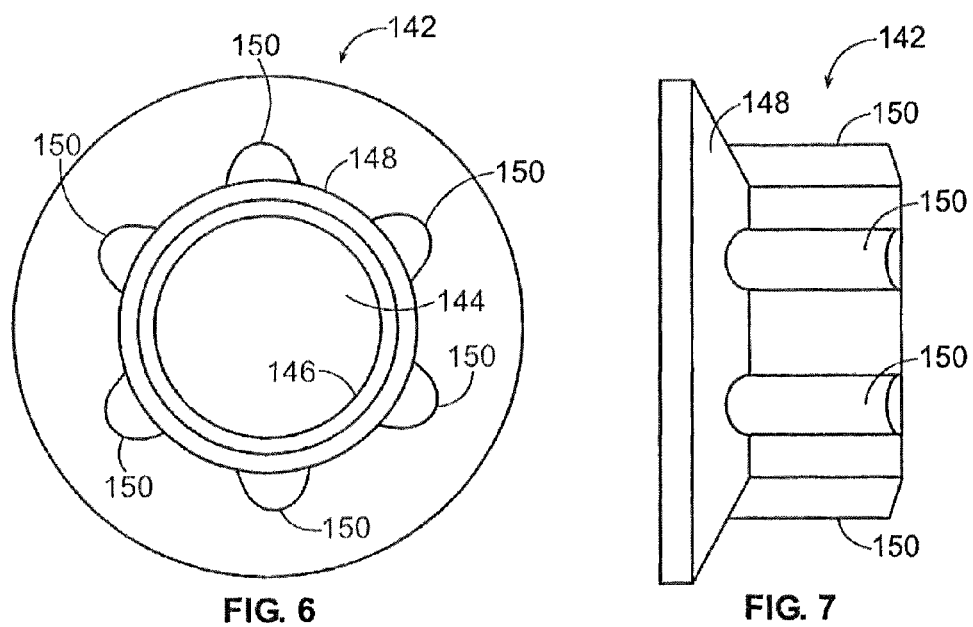
FIG. 6 is a front view of an embodiment of a locknut.
FIG. 7 is a side view of the locknut illustrated in FIG. 6.

A locknut 142 is illustrated in FIGS. 6 and 7. The locknut 142 has an aperture 144 provided therethrough defining an aperture wail 146 which is threaded. An outer surface 148 of the locknut 142 has an external drive configuration formed therein/thereon in order to allow the locknut 142 to be engaged in order to impart a driving or releasing torque to the locknut 142. The external drive configuration formed in/on the locknut 142 is preferably an external TORX® or TORX PLUS® drive configuration, such that outwardly extending lobes 150 are formed on the outer surface 148 of the locknut 142, but it is to be understood that alternative drive configurations could be formed in/on the outer surface 148 of the locknut 142 as desired, such as, for example, a hex drive configuration. The external drive configuration may extend all the way between the ends of the locknut 142, such as with a hex drive configuration, but I a preferred embodiment, the external drive configuration preferably extends from one end of the locknut 142 toward the other end of the locknut 142, extending to a conical portion of the outer surface 148.

Figure 8:
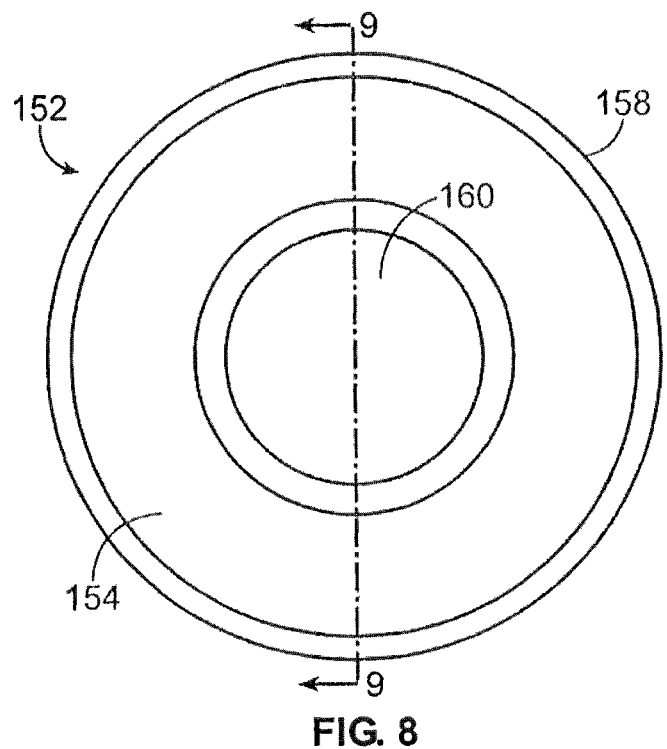
FIG. 8 is a front view of an embodiment of a spacer.
Figure 9:
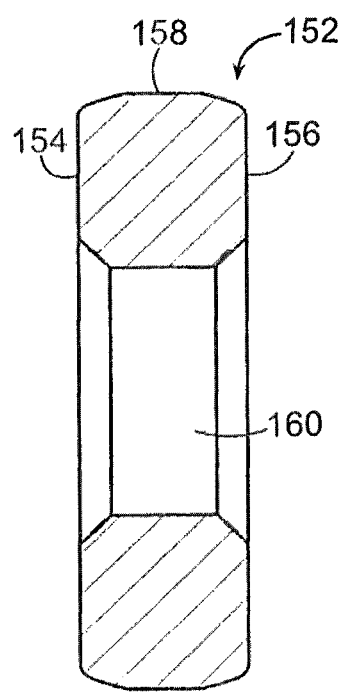
FIG. 9 is a cross-sectional side view of the spacer illustrated in FIG. 8 taken along line 9-9.

In a preferred embodiment, a spacer 152 is provided, which is illustrated in FIGS. 8 and 9. The spacer 152 is disk-shaped such that it preferably has flat ends 154, 156 and a rounded, circular side edge 158. The side edge 158 may be chamfered where it meets the flat ends 154, 156. An aperture 160 is provided through the spacer 152 from one flat end 154 to the other flat end 156. The aperture 160 may be chamfered where it meets the flat ends 154, 156.

Figure 10:
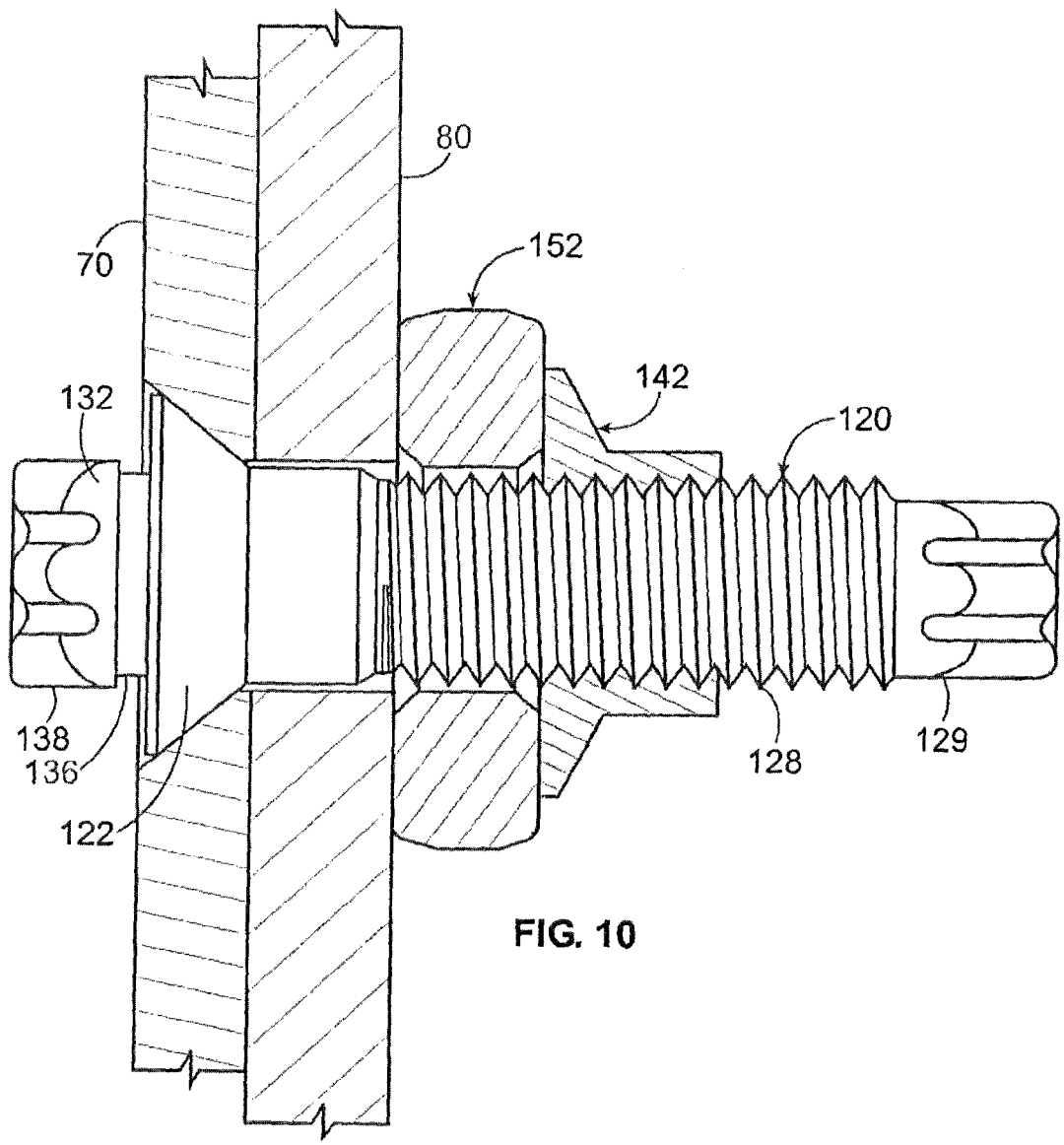
FIGS. 10-12 are partial cross-sectional views illustrated a method of securing the bolt of FIG. 5, the locknut of FIGS. 6 and 7, and the spacer of FIGS. 8 and 9 (FIGS. 10 and 12 only) together and to a wear plate and a side frame.
Figure 11:
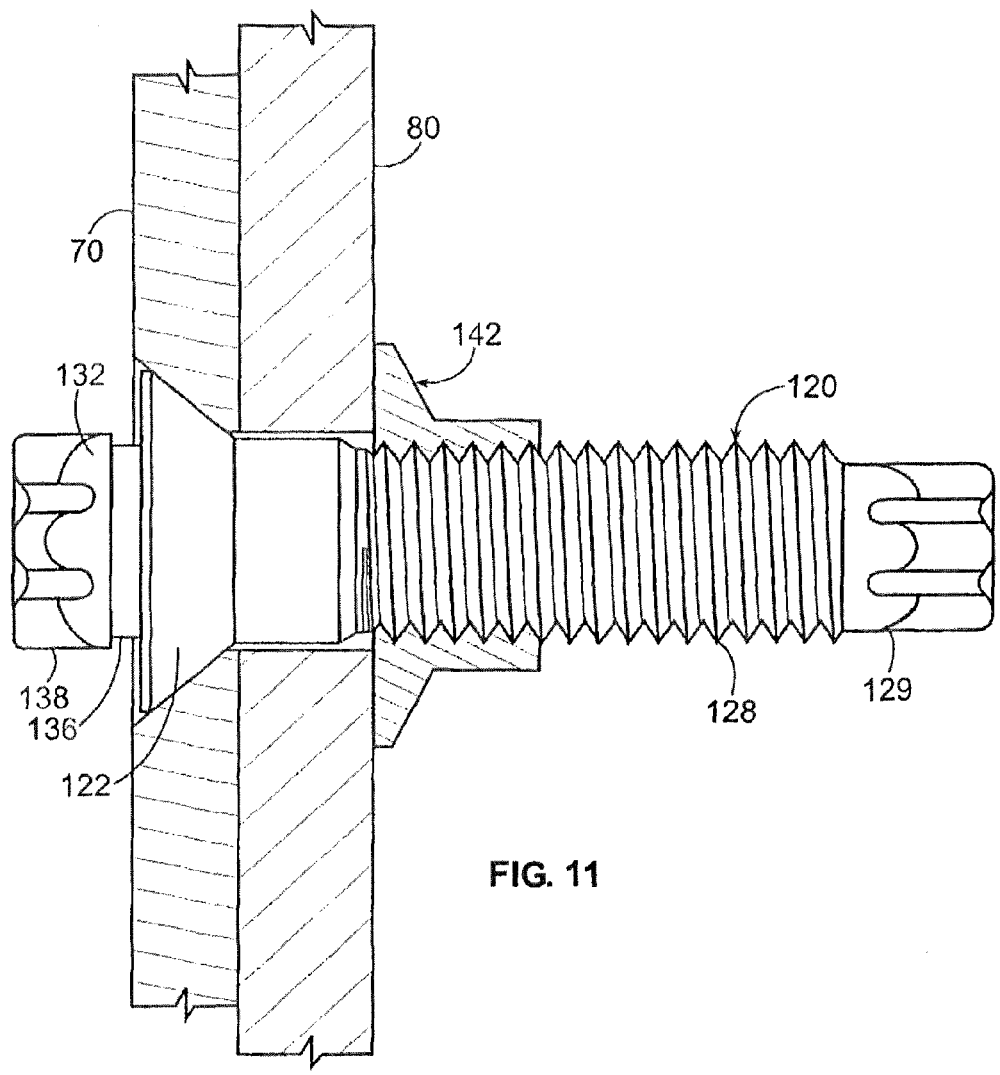

In application, as illustrated in FIG. 10, the bolt 120 is inserted through a hole in the wear plate 70 and then through a hole in the side frame 80 until the enlarged head 122 of the bolt 120 is prevented from moving further through the holes. The hole in the wear plate 70 preferably has a countersink in order to accommodate the tapered enlarged head 122 of the bolt 120. The non-threaded portion of the stem 128 is positioned within the hole of the side frame 80. The spacer 152 is then positioned around the stem 128 of the bolt 120, with the stem 128 extending through the aperture 160, until the flat end 154 generally abuts against the side frame 80. The locknut 142 is then secured to the stem 128 of the bolt 120 by threading the aperture wall 146 of the locknut 142 onto the threaded stem 128 until the locknut 142 bottoms out against the spacer 152. Of course, it is to be understood that the spacer 152 may not be used such that the locknut 142 bottoms out against the side frame 80, as illustrated in FIG. 11. In the preferred and illustrated embodiment, the end of the locknut 142 which does not have the external drive configuration extending therefrom is the end of the locknut 142 that is to be bottomed out against the spacer 152 or the side frame 80. The external drive configuration on the outer surface 148 of the locknut 142 is then engaged by a tool in order to hold the locknut 142 in place, i.e., to prevent further rotation of the locknut 142.

Figure 12:
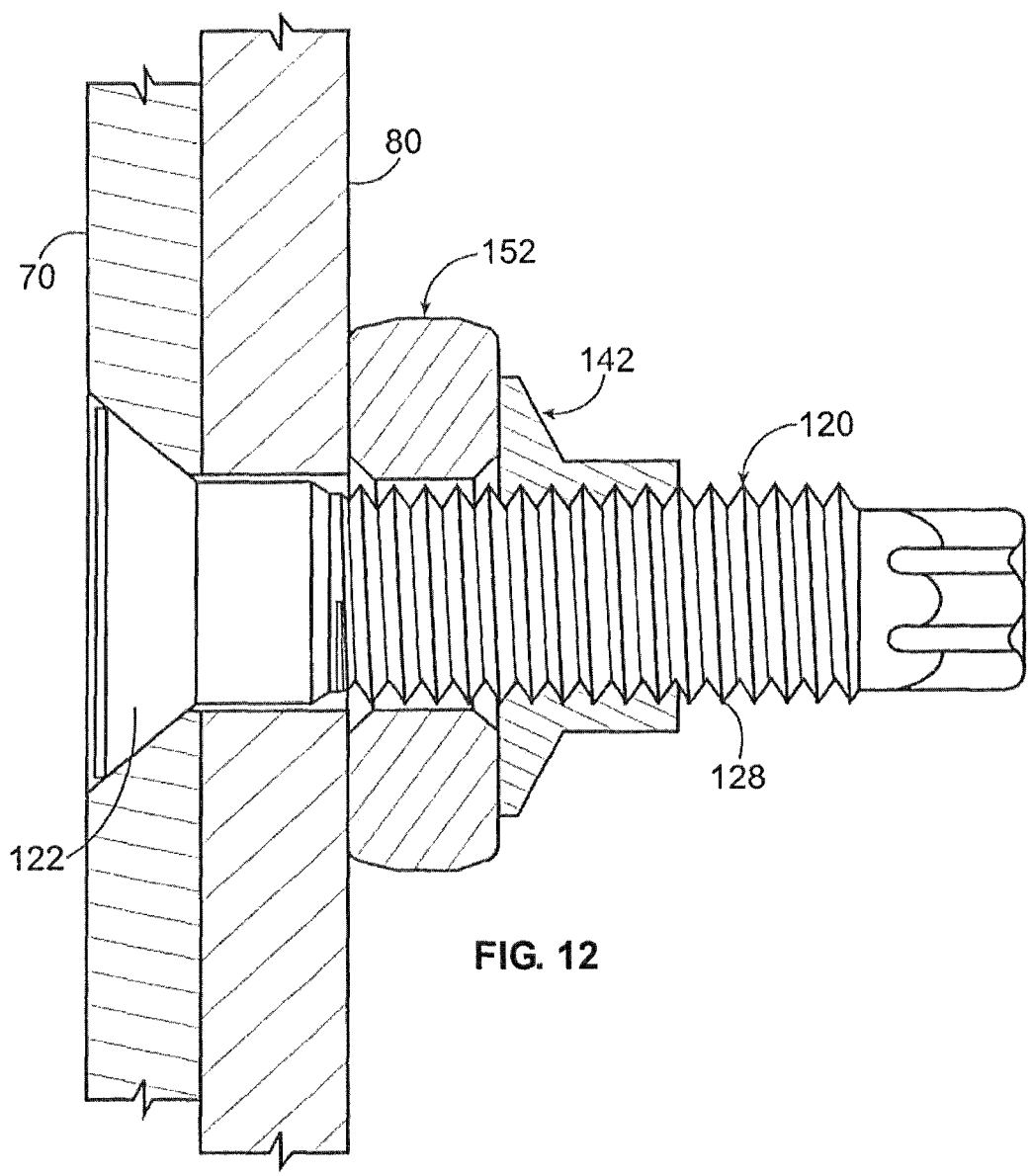
Figure 15:
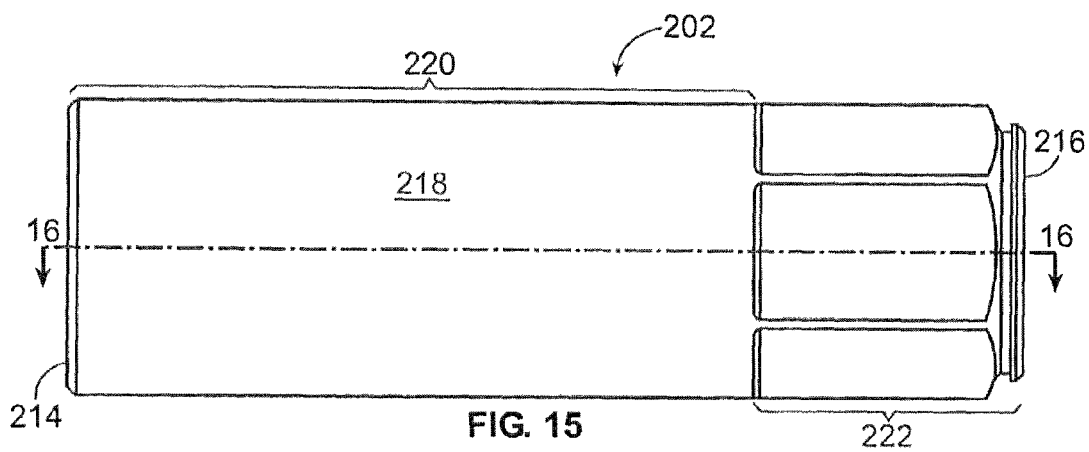
FIG. 15 is a side view of a first driver socket of the dual socket ratchet assembly.
Figure 16:
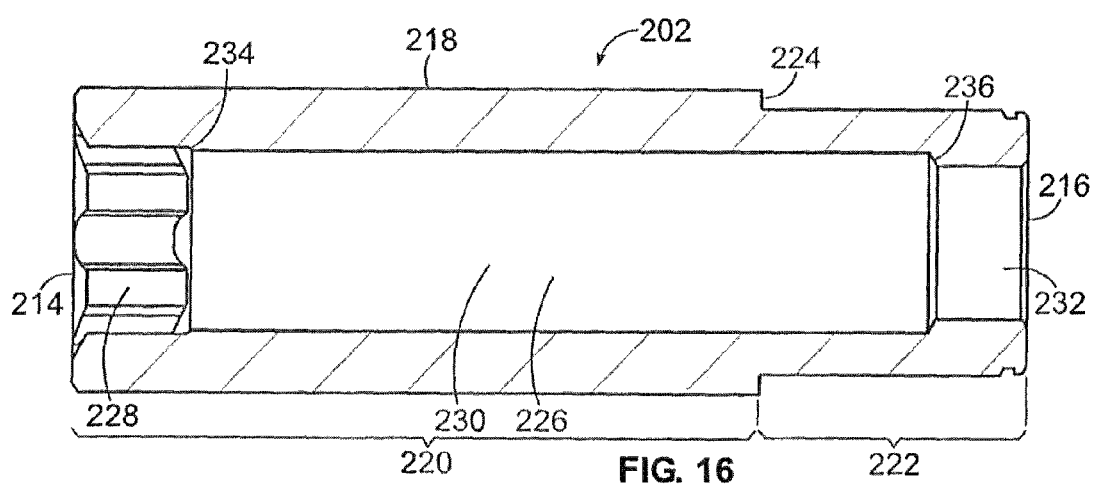
FIG. 16 is a cross-sectional side view of the first driver socket taken along line 16-16 of FIG. 15.
Figure 17:
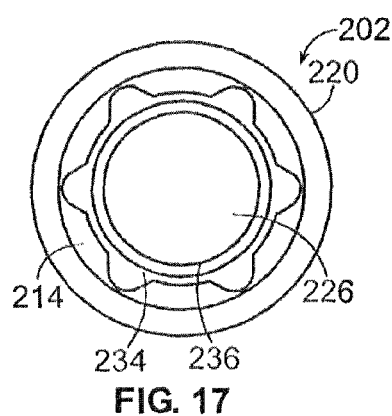
FIG. 17 is a first end view of the first driver socket illustrated in FIG. 15.
Figure 18:
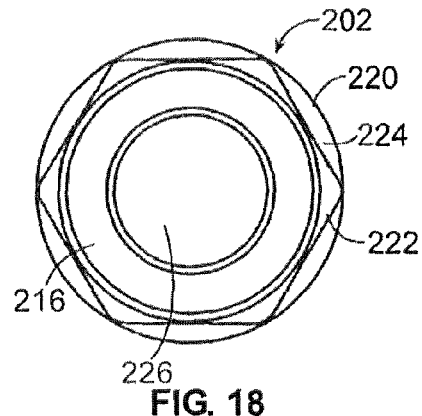
FIG. 18 is a second end view of the first driver socket illustrated in FIG. 15.
Figure 19:
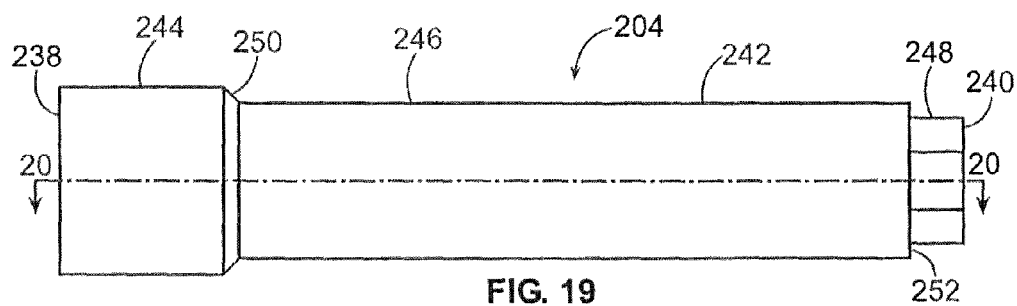
FIG. 19 is a side view of a second driver socket of the dual socket ratchet assembly.
Figure 20:
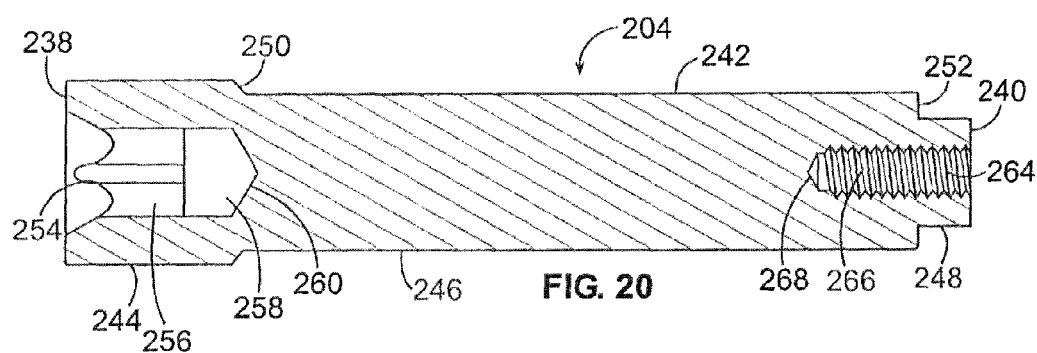
FIG. 20 is a cross-sectional side view of the second driver socket taken along line 20-20 of FIG. 19.
Figure 21:
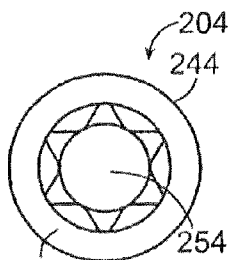
FIG. 21 is a first end view of the second driver socket illustrated in FIG. 19.
Figure 22:
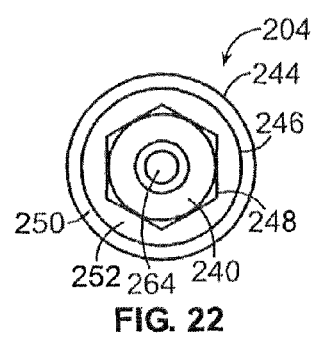
FIG. 22 is a second end view of the second driver socket illustrated in FIG. 19.

Thereafter, a torque applying tool is engaged with the external drive configuration on/in the second portion 138 of the extension member 132 of the bolt 120 in order to further tighten and secure the assembly of the bolt 120, locknut 142, the spacer 152 (if included), the wear plate 70 and the side frame 80 together. In order to ensure that the assembly is not tightened too much, the extension member 132 is configured to break in the first portion 136 thereof when a predetermined torque is reached, as illustrated in FIG. 12. It is to be understood that if the alternative embodiment of the bolt 120a (FIG. 5A) is utilized, no portion of the bolt 120a will break off when a predetermined torque is reached such that the operator will have to ensure that the proper torque is applied by alternative means. The use of the bolt 120a also, unlike the bolt 120, allows for further manipulation of the bolt 120a (i.e., holding the bolt 120a steady or applying further torque to the bolt 120a) proximate the enlarged head 122a as the internal drive configuration defined by the recess 133a remains in the enlarged head 122a.

As the bolt 120 is outfitted with the end portion 129 having the external drive configuration, preferably TORX® or TORX PLUS®, a further nut torque can then be applied to the locknut 142 in order to further ensure the securement of the assembly of the bolt 120, locknut 142, spacer 152 (if included), wear plate 70 and side frame 80 together. A dual socket ratchet assembly 200 is used to apply the nut torque.

The dual socket ratchet assembly 200 is illustrated in FIGS. 13 and 14. In a preferred embodiment, the dual socket ratchet assembly 200 includes first and second driver sockets 202, 204, a ratchet arm 206, a handle 208, a washer 210 and a screw 212.

The first driver socket 202 is best illustrated in FIGS. 15-18. The first driver socket 202 has first and second opposite ends 214, 216. An outer surface 218 of the first driver socket 202 has a cylindrical portion 220 and a hexagonal drive portion 222. The cylindrical portion 220 extends from the first end 214 to the hexagonal drive portion 222 which, in turn, extends generally to the second end 216. A shoulder 224 is provided between the cylindrical portion 220 and the hexagonal drive portion 222.

An aperture 226 is provided through the first driver socket 202 from the first end 214 thereof to the second end 216 thereof. The aperture 226 defines first, second and third portions 228, 230, 232 thereof. The first portion 228 is provided between the first end 214 and the second portion 230, the second portion 230 is provided between the first and third portions 228, 232, and the third portion 232 is provided between the second portion 230 and the second end 216. A shoulder 234 separates the first and second portions 228, 230 such that the first portion 228 defines a larger internal diameter than the second portion 230, and a shoulder 236 separates the second and third portions 230, 232 such that the second portion 230 defines a larger internal diameter than the third portion 232. The shoulders 234, 236 may be straight, curved or tapered as desired. The first portion 228 of the aperture 226 defines an internal drive configuration that is configured to engage the external drive configuration of the locknut 142. Thus, in a preferred embodiment, the internal drive configuration of the first portion 228 is TORX® or TORX PLUS®, but it is to be understood that other types of drive configurations could be used on the locknut 142 and the first portion 228 of the first driver socket 202.

The second driver socket 204 is best illustrated in FIGS. 19-22. The second driver socket 204 has first and second opposite ends 238, 240. An outer surface 242 of the second driver socket 204 has first and second cylindrical portions 244, 246 and a hexagonal drive portion 248. The first cylindrical portion 244 extends from the first end 238 to the second cylindrical portion 246 which, in turn, extends to the hexagonal drive portion 248 which, in turn extends to the second end 240. A first shoulder 250 is provided between the first and second cylindrical portions 244, 246 and a second shoulder 252 is provided between the second cylindrical portion 246 and the hexagonal drive portion 248. The first shoulder 250 is preferably tapered while the second shoulder 252 is preferably straight.

A first recess 254 is provided in the second driver socket 204 at the first end 238 thereof. The first recess 254 has first and second portions 256, 258. The first portion 256 extends from the first end 238 to the second portion 258 which, in turn, extends to a base 260 of the first recess 254. The base 260 of the first recess 254 preferably extends slightly into the second cylindrical portion 246 of the second driver socket 204. The first portion 256 of the first recess 254 defines an internal drive configuration that is configured to engage the external drive configuration of the end portion 129 of the bolt 120. Thus, in a preferred embodiment, the internal drive configuration of the first portion 256 of the first recess 254 is TORX® or TORX PLUS®, but it is to be understood that other types of drive configurations could be used on the end portion 129 of the bolt 120 and the first portion 256 of the first recess 254 of the second driver socket 204.

A second recess 264 is provided in the second driver socket 204 at the second end 240 thereof. The second recess 264 defines a threaded wall 266 which extends to a base 268 of the second recess 264. The base 268 of the second recess 264 is preferably positioned within the second cylindrical portion 246 of the second driver socket 204.

Figure 26:
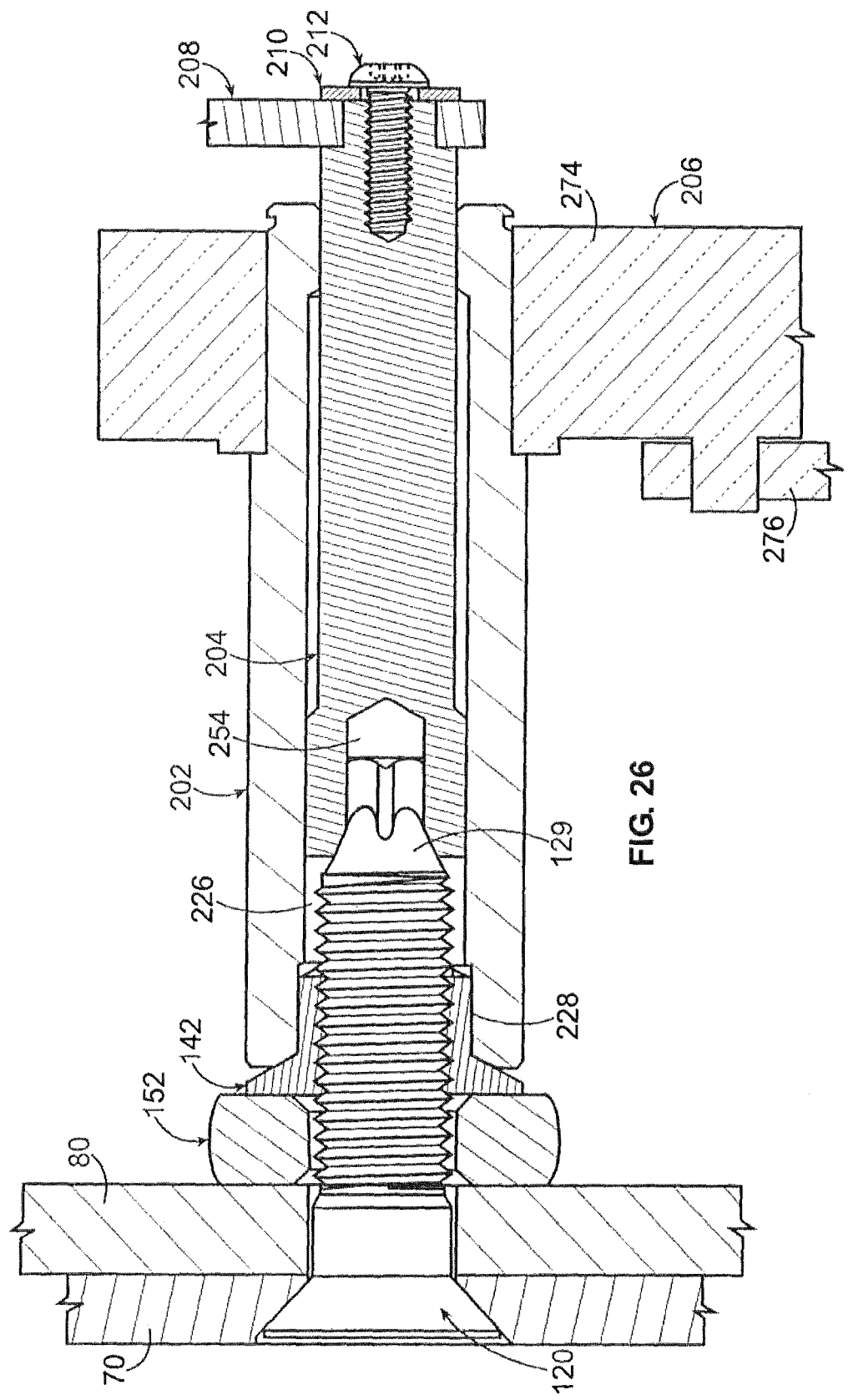
FIG. 26 is a partial cross-sectional view of FIG. 25.

As best illustrated in FIG. 26, the second driver socket 204 is partially positioned within the aperture 226 of the first driver socket 202. The first cylindrical portion 244 of the second driver socket 204 is positioned within the second portion 230 of the aperture 226 and is sized to closely fit within the second portion 230 of the aperture 226, but allows for the first driver socket 202 to rotate relative to the second driver socket 204 and vice versa. The second cylindrical portion 246 of the second driver socket 204 is positioned within the second and third portions 230, 232 of the aperture 226 and is sized to closely fit within the third portion 232 of the aperture 226, but allows for the first driver socket 202 to rotate relative to the second driver socket 204 and vice versa. The second cylindrical portion 246 may also extend beyond the second end 216 of the first driver socket 202. The hexagonal drive portion 248 of the second driver socket 204 is positioned outside of the first driver socket 202 as it extends beyond the second end 216 of the first driver socket 202.

Figure 23:
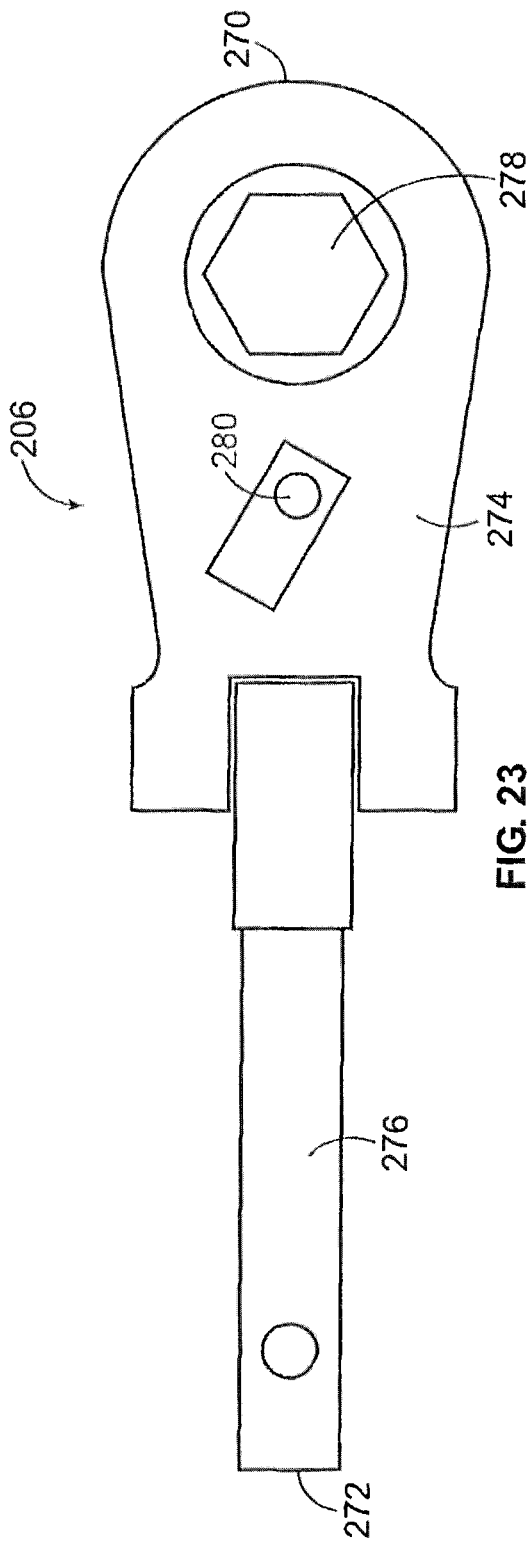
FIG. 23 is a side view of a ratchet arm of the dual socket ratchet assembly.

The ratchet arm 206 is best illustrated in FIG. 23. The ratchet arm 206 is of a type generally well-known in the art and is an elongated member having first and second ends 270, 272 and first and second portions 274, 276. The first portion 274 extends from the first end 270 to the second portion 276 which, in turn, extends to the second end 272. Spring-loaded stop levers (not shown) of a type known in the art are provided in the first portion 274. An aperture 278 is provided through the first portion 274 which defines a hexagonal inner drive configuration that is configured to match the hexagonal drive portion 222 of the first driver socket 202. The first portion 274 also includes a lever 280 in order to switch the spring-loaded stop levers (not shown) from a position allowing rotation in a first direction to a position allowing rotation in a second direction. The second portion 276 acts as an elongated member for providing a mechanical advantage when utilizing the ratchet arm 206. The ratchet arm 206 may abut against the shoulder 224 of the first driver socket 202.

Figure 24:
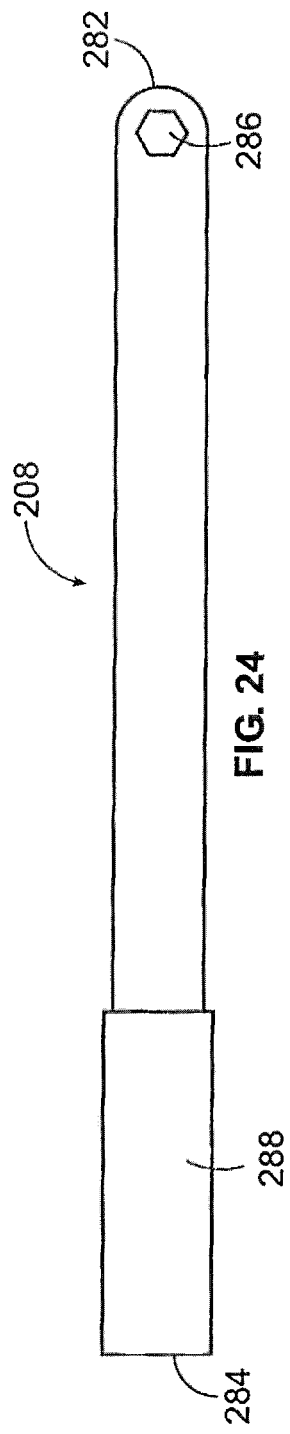
FIG. 24 is a side view of a handle of the dual socket ratchet assembly.

The handle 208 is best illustrated in FIG. 24. The handle 208 is an elongated member having first and second ends 282, 284. An aperture 286 is provided through the handle 208 proximate to the first end 282 thereof. The aperture 286 defines a hexagonal inner drive configuration that is configured to match the hexagonal drive portion 248 of the second driver socket 204. A cover or grip 288 is provided around the handle 208 at the second end 284 thereof.

With the handle 208 engaged with the second driver socket 204, the washer 210 is positioned against the handle 208 and the screw 212 is then inserted through the washer 210, through the aperture 286 of the handle 208 and into threaded engagement with the threaded wall 266 of the second recess 264 of the second driver socket 204, as generally illustrated in FIG. 26. The securement of the screw 212 in this manner prevents the handle 208 from disengaging with the second driver socket 204 as the washer 210 and the shoulder 252 of the second driver socket 204 limit the movement of the handle 208.

Figure 25:
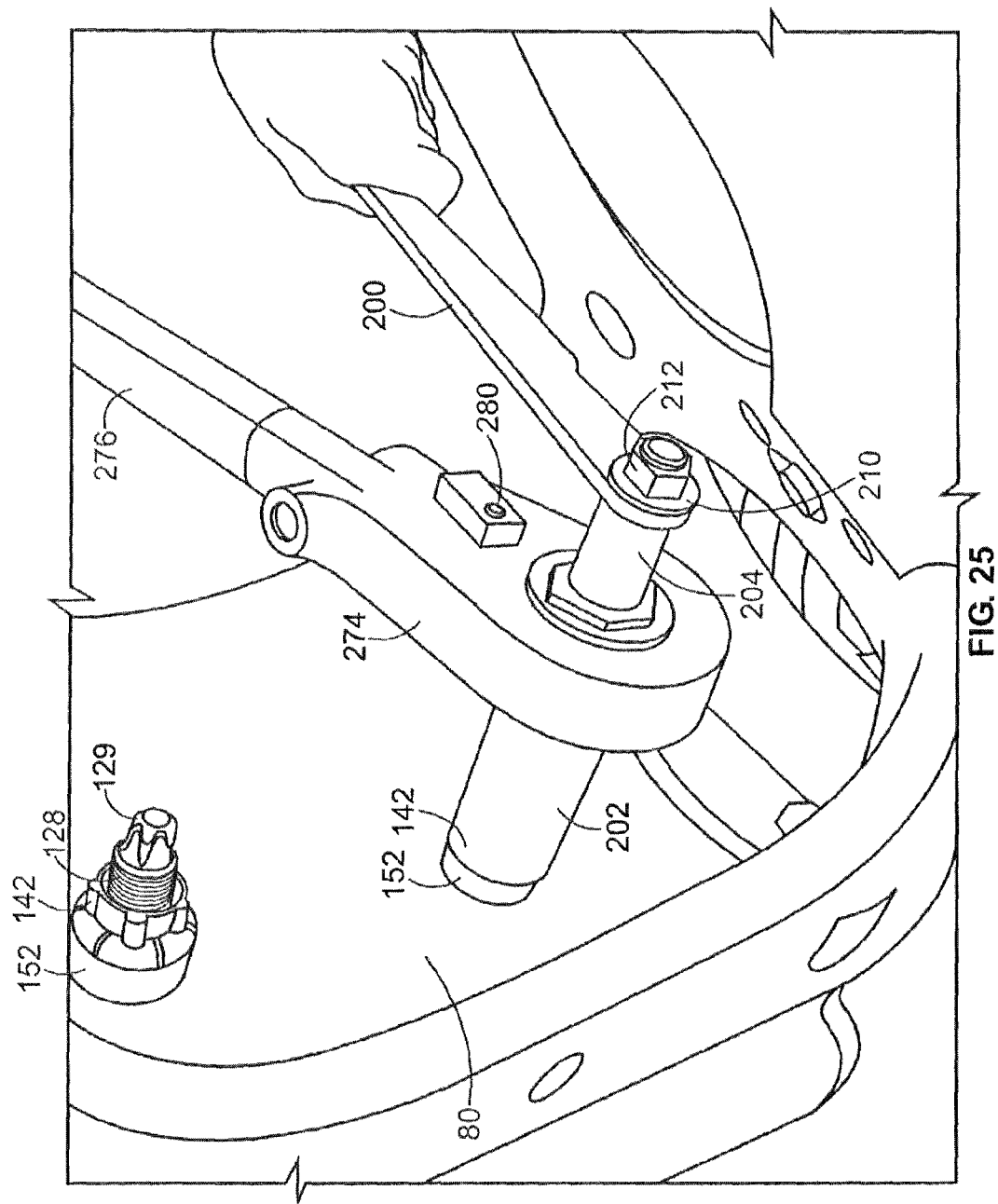
FIG. 25 is a perspective view of the dual socket ratchet assembly being used to apply a nut torque to the locknut after it has been secured as illustrated in FIG. 12.

The dual socket ratchet assembly 200 works to allow for the further torquing of the locknut 142, after the extension member 132 has been broken off of the bolt 120. In operation, as illustrated in FIGS. 25 and 26, the inner drive configuration of the first recess 254 of the second driver socket 204 is engaged with the external drive configuration of the end portion 129 of the bolt 120 and the inner drive configuration of the first portion 228 of the aperture 226 of the first driver socket 202 is engaged with the external drive configuration on the outer surface 148 of the locknut 142.

The handle 208 is then held steady and in place, such that the second driver socket 204 holds the holt 120, preventing the bolt 120 from rotating. With the bolt 120 held steady and in place, the ratchet arm 206 is manipulated in order to have the first driver socket 202 apply torque to the locknut 142, thus providing further torque to the locknut 142 and ensuring the securement of the bolt 120, locknut 142, the wear plate 70 and the side frame 80 together. If desired, a torque wrench 290 can be connected to the second end 272 of the ratchet arm 206 in order to monitor the amount of torque applied to the locknut 142. The torque wrench 290 will provide an audible "click" when the desired torque is reached.

While this audible indicator allows for the initial installer to know that the desired nut torque has been applied, it does not leave any type of a visual indicator that would be desirable for the initial installer to see to confirm that the desired nut torque has been applied, as well as any other persons who may be checking the assembly at some point in time after the initial assembly, for instance at routine maintenance times.

In order to provide this visual indicator, an alternative preferred embodiment of the dual socket ratchet assembly 200 is provided which utilizes the same second driver socket 204, ratchet arm 206, handle 208, washer 210 and screw 212, but which utilizes an alternative first driver socket 402.

The alternative first driver socket 402 is best illustrated in FIGS. 27-30. The first driver socket 402 has first and second opposite ends 414, 416. An outer surface 418 of the first driver socket 402 has a non-drive portion 420, which is preferably cylindrical in configuration, and a drive portion 422, which is preferably hexagonal in configuration. The non-drive portion 420 extends from the first end 414 to the drive portion 422 which, in turn, extends generally to the second end 416. A shoulder 424 is provided between the non-drive portion 420 and the drive portion 422.

An aperture 426 is preferably provided through the first driver socket 402 from the first end 414 thereof to the second end 416 thereof. The aperture 426 defines first, second and third portions 428, 430, 432 thereof. The first portion 428 is provided between the first end 414 and the second portion 430, the second portion 430 is provided between the first and third portions 428, 432, and the third portion 432a is provided between the second portion 430 and the second end 416. A shoulder 434 separates the first and second portions 428, 430 such that the first portion 428 defines a larger internal diameter than the second portion 430, and a shoulder 436 separates the second and third portions 430, 432 such that the second portion 430 defines a larger internal diameter than the third portion 432. The shoulders 434, 436 may be straight, curved or tapered as desired.

Figure 27:
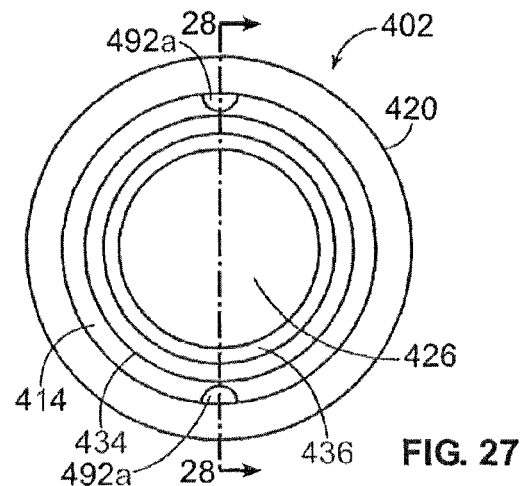
FIG. 27 is a first end view of an alternative first driver socket having protrusions therein in the form of ball bearings which are configured to provide a visual indicator that the proper nut torque has been applied to the locknut.
Figure 28:
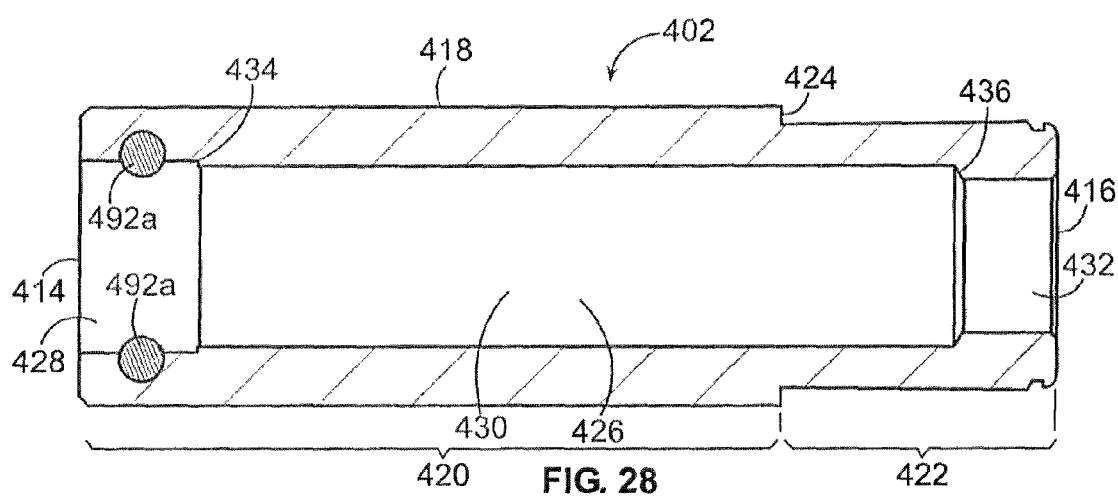
FIG. 28 is a cross-sectional view of the alternative first driver socket illustrated in FIG. 27 taken along line 28-28.
Figure 29:
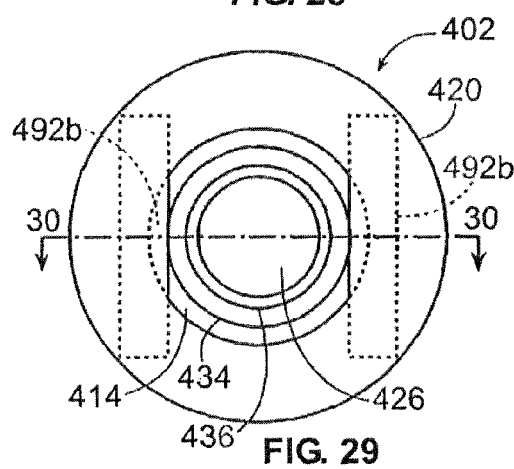
FIG. 29 is a first end view of an alternative first driver socket having protrusions therein in the form of portions of cylindrical rods which are configured to provide a visual indicator that the proper nut torque has been applied to the locknut.
Figure 30:
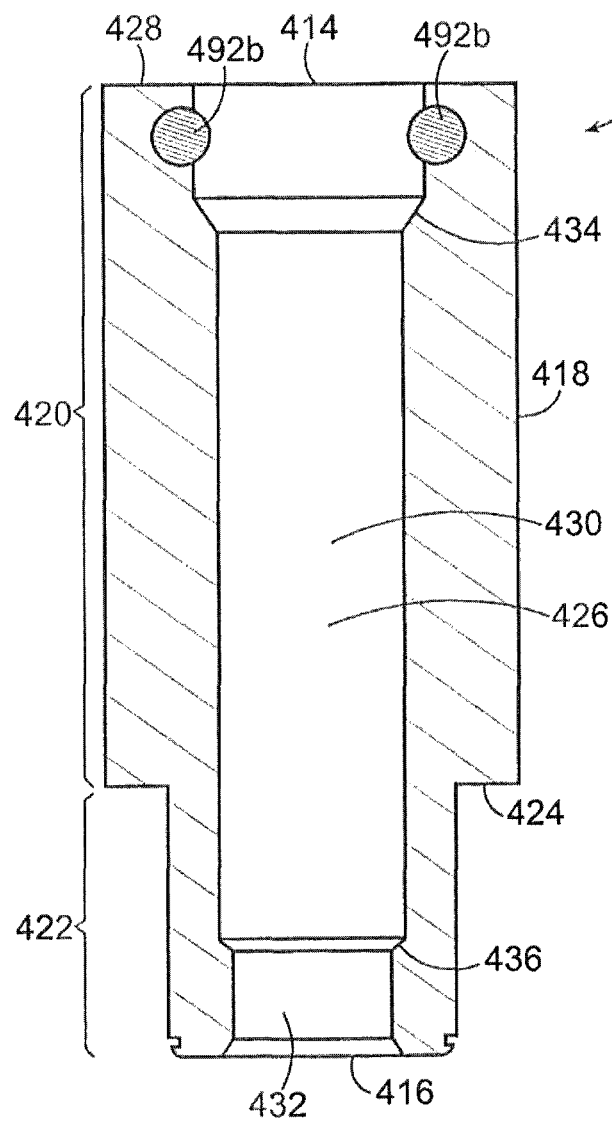
FIG. 30 is a cross-sectional view of the alternative first driver socket illustrated in FIG. 29 taken along line 30-30.

In the preferred embodiment, one or more members 492a, 492b are positioned and secured within the first driver socket 402 and partially protrude into the first portion 428 of the aperture 426. In a first preferred embodiment of the alternative first driver socket 402, the members 492a are ball bearings and preferably number two, which are positioned opposite one another, about 180° apart from one another, as illustrated in FIGS. 27 and 28. Alternatively, a single member 492a could be provided or three members 492a could be provided which are about 120° apart from one another. Of course, four or more members 492a could be provided if desired. Ball bearings are a preferred embodiment of the members 492a because protruding portions of the ball bearings will fit between the outwardly extending lobes 150 formed on the outer surface 148 of the locknut 142 by the preferred external TORX® or TORX PLUS® drive configuration. As such, the members 492a of the first driver socket 402 can alternatively be used to apply the nut torque to the locknut 142 as discussed hereinabove. In a second preferred embodiment of the alternative first driver socket 402, the members 492b are preferably cylindrical rods and number two, which are positioned opposite one another, about 180° apart from one another, as illustrated in FIGS. 29 and 30. Alternatively, a single member 492b could be provided or three members 492b could be provided which are about 120° apart from one another. Cylindrical rods are a preferred embodiment of the members 492b because protruding portions of the cylindrical rods will fit between the outwardly extending lobes 150 formed on the outer surface 148 of the locknut 142 by the preferred external TORX® or TORR PLUS® drive configuration. As such, the portions of the members 492b of the first driver socket 402 can alternatively be used to apply the nut torque to the locknut 142 as discussed hereinabove. It is to be understood that any other appropriate member 492 could be used, so long as the portion of the member 492 which protrudes into the first portion 428 of the aperture 426 is capable of performing the function of the portion of the bail bearing member 492a or the portion of the cylindrical rod member 492b as discussed hereinbelow. It is also to be understood that the members 492 may be integrally formed with the body of the first driver socket 402, rather than being non-integral as illustrated.

Figure 31:
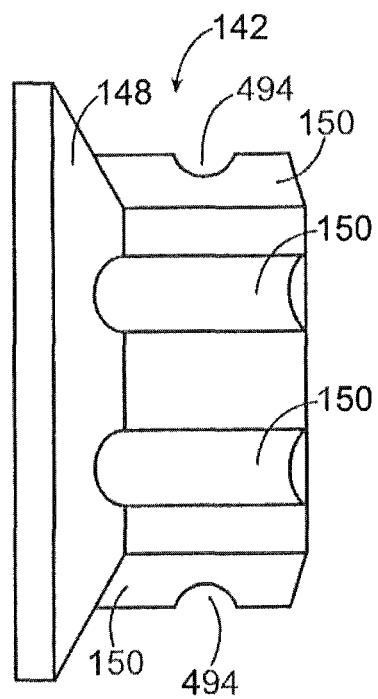
FIG. 31 is a side view of the locknut having grooves or notches formed therein which provide a visual indicator that the locknut has been subjected to the proper nut torque.

Unlike the internal drive configuration in the first portion 228 of the aperture 226 of the first driver socket 202, the protruding portions of the members 492a, 492b in the first portion 428 of the aperture 426 of the first driver socket 402 are configured to leave a visual indicator on the locknut 142 when the desired torque value is achieved. More specifically, and as illustrated with regard to the preferred embodiment, the protruding portions of the members 492a, 492b leave a marking, such as a groove or notch 494, as illustrated in FIG. 31, on one or more of the external lobes 150 of the locknut 142. The marking could be formed in a number of manners, for example by shearing or the lobe 150 or by deformation of the lobe 150. The marking of the locknut 142 provides a number of benefits. For instance, the marking provides a visual indicator that the locknut 142 has been subjected to the desired torque during initial assembly and application of the nut torque. It also provides a visual indicator, if additional sets of lobes 150 have been marked, that the locknut 142 has been subjected to the desired torque during routine service maintenance. Also, it eliminates the initial cost, maintenance and calibration of a torque wrench; the marking of the lobes 150, rather than the torque wrench, will provide the indication that the proper nut torque has been applied.

During maintenance, the maintenance worker will be able to verify that the proper clamp load had been applied by the presence of one or more marked lobes 150 on the locknut 142. If there are still unmarked lobes 1.50 left on the locknut 142, the maintenance worker will then have the option to reuse the locknut 142 and to reapply the nut torque to ensure that the proper torque value, and therefore the proper clamp load, is again applied. This reapplication of the nut torque can again mark one or more of the previously unmarked lobes 150 in order to provide the maintenance worker with visual confirmation that the proper nut torque has been applied. If the locknut 142 does not have any remaining unmarked lobes 150, the maintenance worker may then elect to either remove the locknut 142 and replace it with a new locknut 142, or to remove the entire bolt assembly and replace it with a new bolt assembly, as desired.

While this invention has been described with regard to bolting assemblies used in connection with side frame column friction wear plates for railway cars, it is to be understood that the teachings of this invention are applicable to a wide variety of applications. For instance, any fastening assembly having a need to confirm that a proper clamp load has been initially applied, any fastening assembly having a need to confirm that a proper clamp load has been maintained at some point in time after initial assembly, and any fastening assembly having a need to reapply a clamp load at some point in time after initial assembly. Also, the use of a socket driver having protrusions used to mark a portion of a fastener upon a predetermined torque being applied in order to provide a visual indicator that the proper clamp load has been applied can be used universally in the fastener arts where appropriate. It should be noted that while the protrusions described herein are provided in a female portion of a fastening assembly, that the protrusions could alternatively be provided on a male portion of a fastening assembly such that lobes or the like on the female inner drive configuration would be marked, providing the desired visual indicator.

It Should be understood that this invention is not intended to be limited to the preferred embodiments described and illustrated herein, namely the marking of lobes of a TORX® or TORX PLUS® drive configuration, as the teachings of this invention can also be used to mark other types of drive configurations by using similar or equivalent methods or apparatuses.

It should also be understood that, if desired, if the bolt 120*a* is used, the bolt 120*a* could alternatively be held in place at its enlarged head 122*a*, rather than at the end portion 129, by a device having an external drive configuration that is configured to engage with the internal drive configuration defined by the recess 133*a* in the enlarged head 122*a*. In this instance, a typical ratchet tool utilizing the first driver socket 402, rather than the dual socket ratchet assembly 200, could be utilized in order to apply the proper torque value and to mark the locknut 142 secured around the bolt 120*a*.

It should further be understood that this invention is not intended to be limited to the marking of locknuts having external drive configurations, but could be utilized on any type of device having a drive configuration, whether external or internal. For instance, the first driver socket 402 could be utilized to mark an external drive configuration provided on an extension member provided on a head of a bolt, such as, for instance, the extension members 32, 132 provided on bolts 20, 120, respectively, or other bolts where the extension members are not configured to be broken off. Likewise, a device having the protrusions extending outwardly therefrom, rather than into an aperture (such as in a drive socket), could be utilized to mark an internal drive configuration provided in a recess of a head of a bolt, such as, for instance the recess 133*a* in enlarged head 122*a* of bolt 120*a*.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosed embodiments of the invention and does not pose a limitation on the scope of the invention unless otherwise claimed. No language in the specification should be construed as indicating any non-claimed element as essential to the practice of the invention it is further to be understood that the drawings are not necessarily drawn to scale.

Preferred embodiments of this invention are described herein, including the best mode known to the inventor for carrying out the invention, it should be understood that the illustrated embodiments are exemplary only, and should not be taken as limiting the scope of the invention.

The invention is claimed as follows:

1. A fastening assembly comprising:
    a first article of configuration configured to have at least one protrusion extending therefrom; and
    a second article of configuration having a drive configuration, said at least one protrusion of said first article of configuration configured to provide a visual indicator on a portion of said drive configuration upon application of a predetermined torque to said first article of configuration relative to said second article of configuration,
    wherein said at least one protrusion extends into an aperture provided through said first article of configuration and said drive configuration is provided on an external surface of said second article of configuration, and
    wherein said first article of configuration is a drive socket and wherein said second article of configuration is a locknut.

2. The fastening assembly as defined in claim 1, wherein said at least one protrusion is a portion of a ball bearing.

3. The fastening assembly as defined in claim 1, wherein said at least one protrusion is a portion of a cylindrical rod.

4. The fastening assembly as defined in claim 1, wherein said drive configuration is a TORX® drive configuration.

5. The fastening assembly as defined in claim 1, wherein said drive configuration is a TORX PLUS® drive configuration.

* * * * *